United States Patent [19]
Showalter

[11] Patent Number: 5,588,690
[45] Date of Patent: Dec. 31, 1996

[54] DOUBLE BACK GOLF CART ENCLOSURE

[75] Inventor: Jerry M. Showalter, Wesley Chapel, Fla.

[73] Assignee: Tampa G Manufacturing Co., Tampa, Fla.

[21] Appl. No.: 569,787

[22] Filed: Dec. 8, 1995

[51] Int. Cl.$^6$ ............................................. B60J 9/00
[52] U.S. Cl. ...................... 296/77.1; 296/135; 296/83; 296/100; 296/141; 135/88.09
[58] Field of Search ........................ 296/100, 102, 296/135, 77.1, 79, 80, 83, 138, 140, 141, 143, 145; 135/88.01, 88.02, 88.09; 280/DIG. 5

[56] References Cited

U.S. PATENT DOCUMENTS

| | | | |
|---|---|---|---|
| 4,098,536 | 7/1978 | Mills | 280/DIG. 5 X |
| 4,830,037 | 5/1989 | Held | 280/DIG. 5 X |
| 5,259,656 | 11/1993 | Carroll | 296/135 X |

*Primary Examiner*—Dennis H. Pedder
*Attorney, Agent, or Firm*—Dominik & Stein

[57] ABSTRACT

A double back golf cart enclosure for removable installation about a golf cart or similar vehicle for protecting the occupants from inclement weather. The double back enclosure comprises a roof panel having a configuration corresponding to the configuration of the roof structure of the golf cart, side panels and a first and second back cover suspended therefrom about the periphery of the golf cart so to completely enclose the golf cart. The double back enclosure allows for ready access to the rear of the golf cart while providing complete and continuous isolation and protection of the golf cart occupants from inclement weather. The roof panel includes a hem portion about its periphery that facilitates the rolling up and securing of the back covers thereunder to be out of the way allowing free movement about the golf cart.

11 Claims, 4 Drawing Sheets

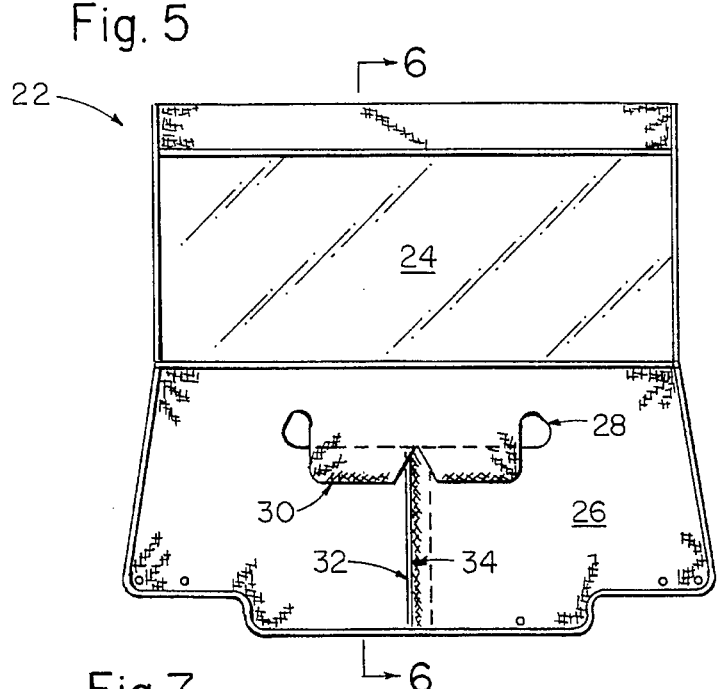
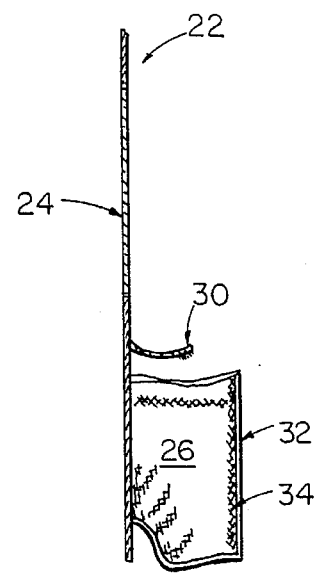
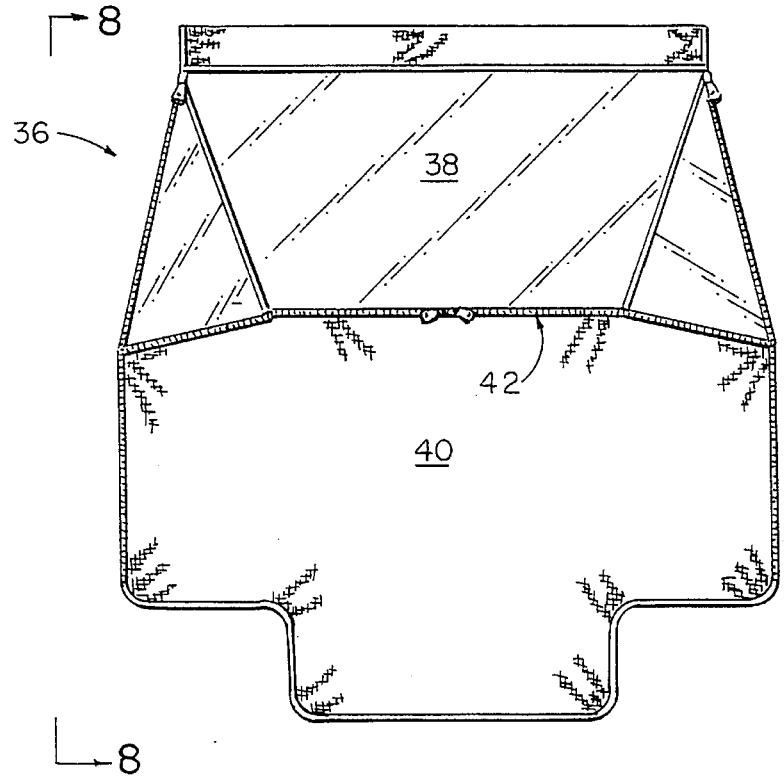
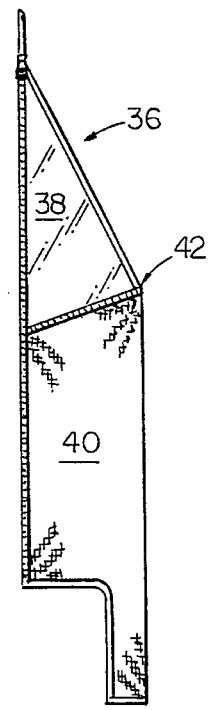

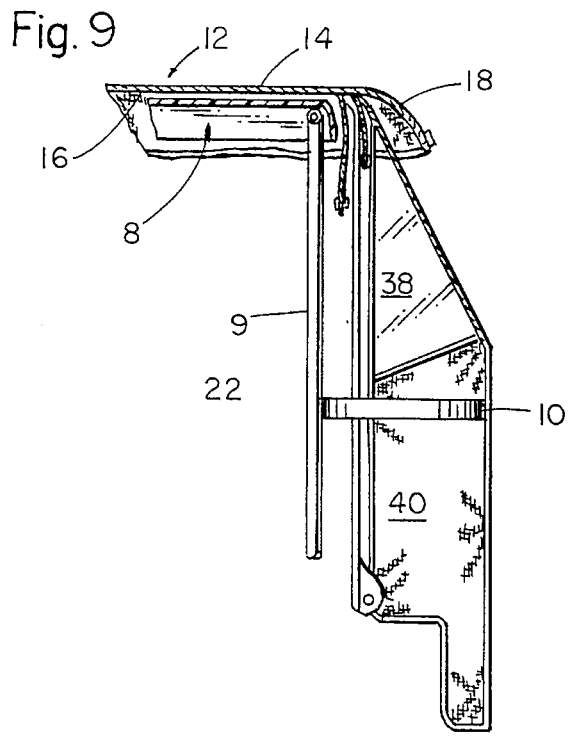
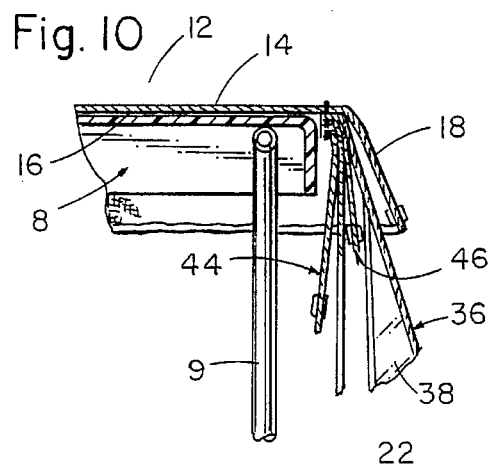
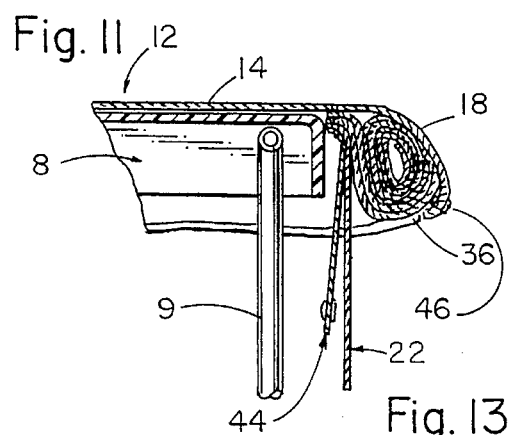
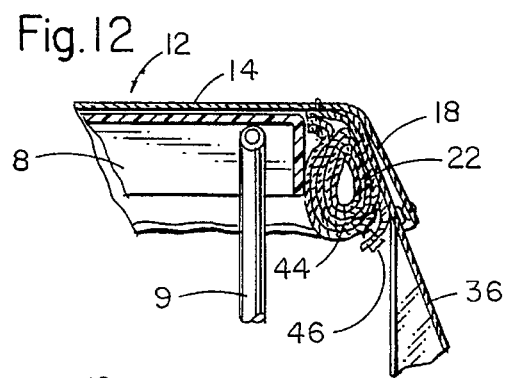
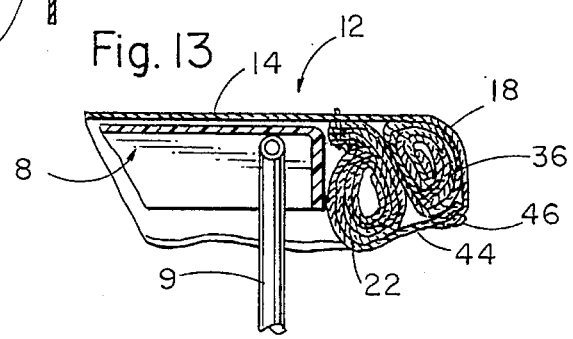

DOUBLE BACK GOLF CART ENCLOSURE

BACKGROUND OF THE INVENTION

1. Field of the Invention

This invention relates to a golf cart enclosure and, more particularly, to a double back golf cart enclosure for use on standard golf carts used in the golfing industry.

2. Description of the Background Art

Presently, there exists many types of golf cart enclosures designed to protect the occupants of the golf cart in the event of precipitation such as rain. Basically, these types of golf cart enclosures each comprise one or more sheets or panels of translucent or transparent material which is affixed between the roof structure and the undercarriage of the golf cart. The panels are secured to adjacent panels by zippers or similar fasteners to allow passenger ingress and egress and to allow access to the golf clubs stored at the rear of the golf cart.

Present golf club enclosures utilize a single back cover that encloses the golf clubs within the rear of the golf cart. Examples of such are illustrated in U.S. Pat. Nos. 3,709,533; 4,013,315; 4,098,536; 4,773,694, and 5,259,656 the disclosures of which are hereby incorporated by reference herein.

All of the golf cart enclosures illustrated in the above-referenced patents function to protect the occupants in the event of precipitation or inclement weather. However, in order to access golf clubs or other articles that are placed in the rear of the golf cart, the back cover of the enclosure must be opened or removed to some extent to allow access therein which results in the enclosed area within the golf cart being exposed to the inclement weather. This particular inadequacy of the present golf cart enclosures becomes more severe and problematic in cold weather. Everytime the rear of the golf cart is to be accessed, the cold air is allowed to enter into the enclosed occupant area where the driver and passenger sit, thereby negating the enclosure's protective effect from the cold weather.

Other present golf cart enclosures utilize a single back cover that hangs straight down between the occupant area of the golf cart and the rear of the golf cart where the golf clubs are typically stored. However, enclosures having a "straight back", do not provide protection for the golf clubs positioned at the rear of the golf cart.

Therefore, it is an object of this invention to provide an improvement which overcomes the aforementioned inadequacies of the prior art devices and provides an improvement which is a significant contribution to the advancement of the golf cart enclosure art.

Another object of this invention is to provide a golf cart enclosure that allows for the isolation from inclement weather and at the same time allows for golf clubs to be openly exposed for easy access.

Another object of this invention is to provide a golf cart enclosure having two separate individual back covers that roll up and tuck away under the hem portion of the roof panel about the periphery of the roof structure.

Another object of this invention is to provide a golf cart enclosure whereby the golf bag compartment is not enclosed and can be utilized for the carrying of other articles while, at the same time, the enclosure still provides an enclosed area for the driver and passenger.

Another object of this invention is to provide a golf cart enclosure having two separate individual back covers that each contain transparent portions to facilitate the driver viewing to the rear when the back covers are suspended downward and fastened into position.

Another object of this invention is to provide a golf cart enclosure that is capable of being completely stored out of the way on the roof structure when not being used.

Another object of this invention is to provide an enclosure for a golf cart or other vehicle having a roof structure secured above a body portion of the vehicle and a club carrier bracket, said enclosure comprising in combination: a roof panel having an underside corresponding to the configuration of the roof structure of the golf cart, the roof panel being coupled to said roof structure; a hem portion coupled to the roof panel about its periphery corresponding to the peripheral configuration of the roof structure of the golf cart; a first back cover coupled to and suspended downward from the underside of the roof panel about the roof panel's rearward periphery and about the periphery of the roof structure; a second back cover coupled to and suspended downward from the underside of the roof panel about the roof panel's rearward periphery and about the periphery of the roof structure; a first securing means positioned about the rearward periphery of the roof panel for retaining a bight of the first back cover under the hem portion and positioned about the peripheral configuration of the roof structure; and a second securing means positioned about the rearward periphery of the roof panel for retaining a bight of the second back cover under the hem portion and positioned about the peripheral configuration of the roof structure.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing this invention, the invention comprises a golf cart enclosure that can be installed about a golf cart or similar vehicle so to protect the driver, passenger, and cargo from inclement weather. More particularly, the golf cart enclosure comprises two separate individual back covers of which can be used to complete the enclosure exclusive of each other. The particular enclosure of the invention includes a roof panel having a configuration that corresponds to the configuration of the roof structure of the golf cart. There are side panels as well that suspend downward from the roof panel and aggregate with the back covers to form the enclosure. Zippers or similar fasteners are provided along the lines of the side panels to allow passengers ingress and egress from the golf cart.

The novel feature of this invention comprises the roof panel having a hem portion and two separate individual back covers that roll up and tuck away under the hem portion about the periphery of the roof structure. The providing of two separate back covers allows for the complete and continuous isolation and protection from inclement weather even while accessing the rear of the golf cart. This ability overcomes a common inadequacy that is present in all of the prior art.

An important feature of the present invention is that the golf cart enclosure includes two separate individual back covers that can be used exclusive of one another as well as jointly so to protect the driver, passenger, and cargo from inclement weather.

Another important feature of the present invention is that the enclosure provides for the easy roll-up and storage of the back covers about the periphery of the roof structure so as not to interfere with free movement about the golf cart.

Another important feature of the present invention is that the two separate individual back covers each contain transparent portions to facilitate the driver viewing to the rear of the golf cart when the back covers are suspended down and fastened into position.

Therefore, it can be readily appreciated that the present invention provides continuous and complete isolation and protection from inclement weather while at the same time allowing access to the rear of the golf cart.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 5 is a frontal elevation view of the first back cover showing the transparent portion, the translucent portion, the horizontal slit, the closure flap, and the vertical slit in their relative positions;

FIG. 6 is a cross-sectional view taken along line 6—6 of FIG. 5 illustrating the closure flap and the vertical slit in their open states;

FIG. 7 is a frontal elevation view of the second back cover showing the transparent portion, the translucent portion, and the fastener means extending horizontally across the second back cover for facilitating the accessing of the rear of the golf cart;

FIG. 8 is a side view taken along line 8—8 of FIG. 7 illustrating the depth of the second back cover that is used to enclose title golf clubs and bags;

FIG. 9 is a cross-sectional view taken along line 9—9 of FIG. 4 showing the roof structure, the roof panel, the first securing means, the first back cover, the second securing means, the second back cover, the hem portion, and the club carrier bracket in their relative positions to each other;

FIG. 10 is an enlarged cross-sectional view taken along line 9—9 showing the first securing means, the first back cover, the second securing means, the second back cover, and the hem portion in their relative positions to each other;

FIG. 11 is an enlarged cross-sectional view taken along line 9—9 showing the second back cover rolled-up and tucked away under the hem portion while the first back cover is suspended downward in use;

FIG. 12 is an enlarged cross-sectional view taken along line 9—9 showing the first back cover rolled-up and tucked away under the hem portion while the second back cover is suspended downward in use; and FIG. 13 is an enlarged cross-sectional view taken along line 9—9 showing both the first back cover and the second back cover being rolled-up and secured under the hem portion.

Similar reference characters refer to similar parts throughout the several views of the drawings.

DETAILED DESCRIPTION OF THE PREFERRED EMBODIMENT

Figure 1:
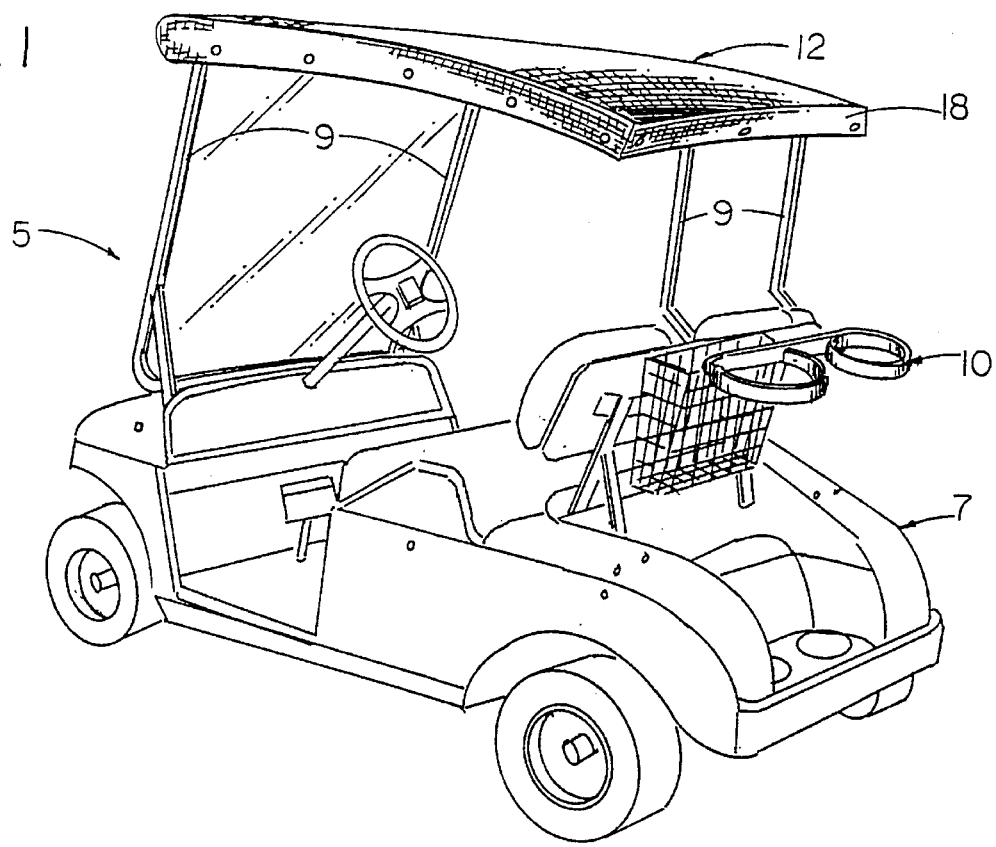
FIG. 1 is a perspective view of a golf cart having the enclosure positioned on the roof structure with the side panels and back covers rolled-up and retained under the hem portion.

Shown in the figures, with particular reference to FIG. 1, there is shown a golf cart 5 having a body portion 7, a roof structure 8, a support structure 9, and a club carrier bracket 10. The enclosure 12 is coupled and secured to the roof structure 8 of the golf cart 5. FIG. 1 illustrates the enclosure 12 secured in place on the roof structure 8 in a stored state having the golf cart 5 freely open.

Figure 2:
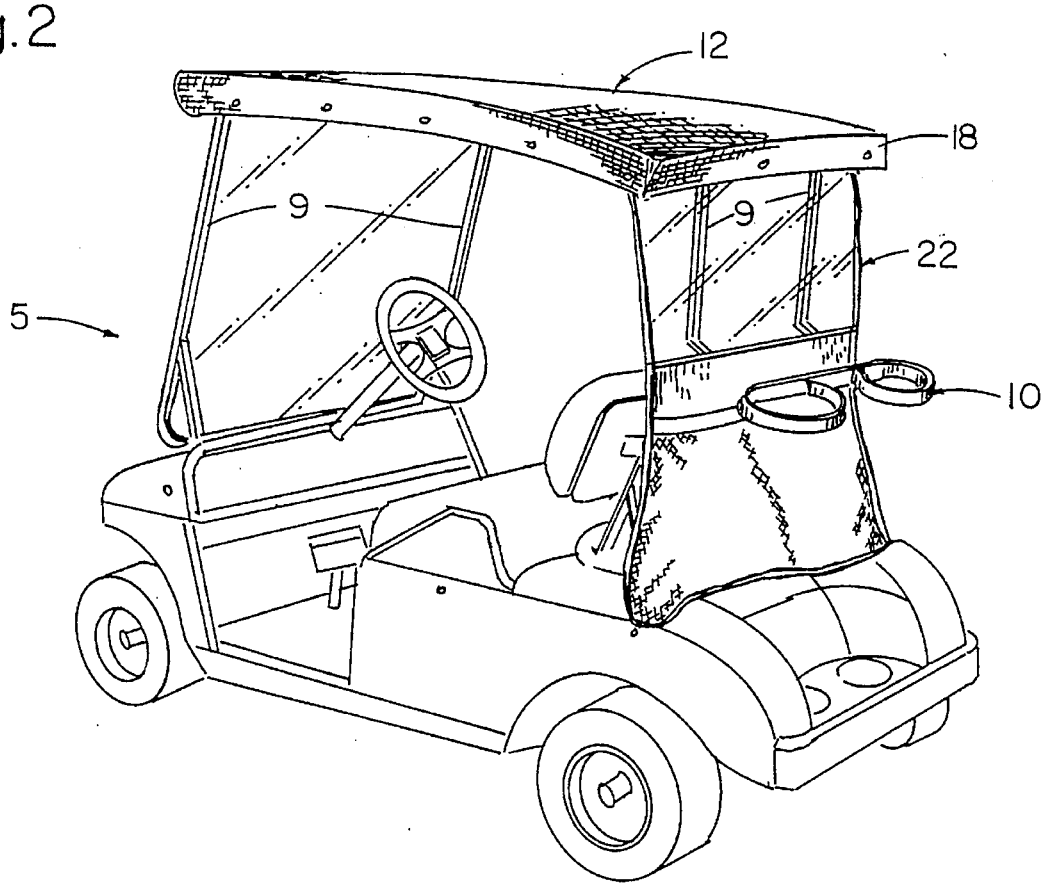
FIG. 2 is a perspective view of a golf cart having the enclosure in position on the roof structure with the first back cover suspended down and fastened in position.
Figure 3:
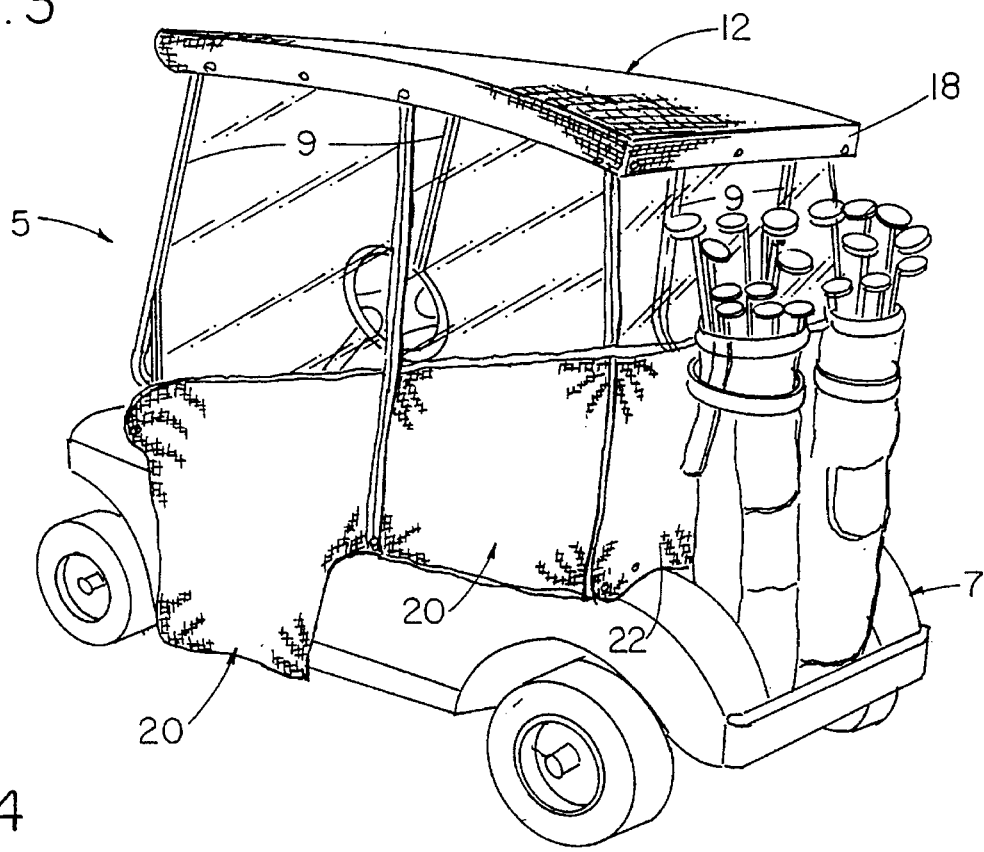
FIG. 3 is a perspective view of a golf cart having the enclosure in place on the roof structure with the side panels and first back cover suspended down and fastened in their relative positions with the golf bag compartment exposed.
Figure 4:
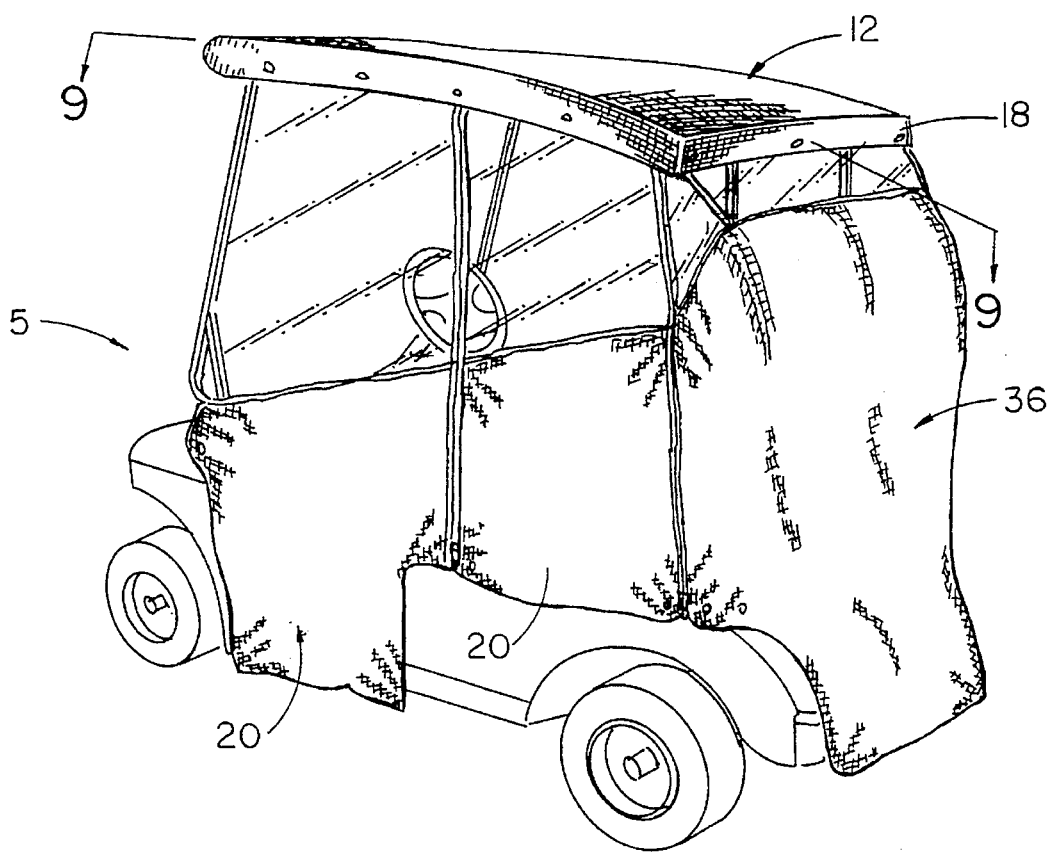
FIG. 4 is a perspective view of a golf cart having the enclosure in position on the roof structure with the side panels, the first back cover, and the second back cover suspended down and fastened into their relative positions so to enclose the golf club compartment.

In referring to FIGS. 2, 3 and 4, the enclosure 12 can be seen in its various modes of use. The enclosure 12 comprises a roof panel 14 having an underside 16, a hem portion 18, side panels 20, a first back cover 22 and a second back cover 36. FIG. 2 depicts the enclosure 12 in place on the roof structure 8 with the first back cover 22 being suspended downward and fastened to the body portion 7 of the golf cart 5. The club carrier bracket 10 can be seen to be protruding through and out from the first back cover 22. The first back cover 22 is shown to be fastened to the body portion 7 of the golf cart 5 by way of standard snaps commonly used in the industry. FIG. 3 shows the side panel 20 being suspended downward from the periphery of the roof panel 14 so as to form a closed in compartment within the golf cart 5. The first back cover 22 is coupled to the side panels 20 by way of conventional snaps used commonly in the industry. FIG. 4 depicts the enclosure 12 having the side panels 20, the first back cover 22 and the second back cover 36 all being suspended downward to completely enclose the golf cart 5.

In now referring to FIG. 5, the first back cover 22 is shown in an elevation view. The first back cover 22 is formed from a first upper transparent portion 24 and a first lower translucent portion 26. The first upper transparent portion 24 and the first lower translucent portion 26 are coupled together by way of conventional stitching used commonly in the industry. In the first lower translucent portion, a horizontal slit 28 is positioned to allow the passage of the club carrier bracket 10 therethrough. A closure flap 30 is integral with the first lower translucent portion 26 and facilitates the covering of the horizontal slit 28 once the club carrier bracket 10 has been passed therethrough.

Further, a vertical slit 32 is positioned midway in the first lower translucent portion 26 so as to facilitate easy passage of the club carrier bracket 10 through the horizontal slit 28. The vertical slit 32 includes a closing means for securing the vertical slit in a closed state. The closing means is comprised of a VELCRO, or hook and loop, strip 34 that is fixed to the vertical slit 32 by way of conventional stitching. FIG. 6 shows a cross-sectional view taken along line 6—6 of the first back cover 22 having its closure flap 30 and vertical slit 32 in their open states.

In referring to FIGS. 7 and 8, the second back cover 36 is shown in an elevational and side view taken along line 8—8. The second back cover 36 is further comprised of a second upper transparent portion 38 and a second lower translucent portion 40. The second upper transparent portion 38 is coupled to the second lower translucent portion 40 by way of a fastener means which allows for accessing the rear of the golf cart 5. The fastener means is comprised of a conventional zipper used commonly in the industry. The second back cover 36 is coupled to the side panels 20 by way of conventional zippers used commonly in the industry. FIG. 8 taken along the line 8—8 illustrates the depth provided by the second back cover 36 so as to allow room for golf clubs and bags to be carried in the rear of the golf cart 5.

In referring now to FIG. 9, a cross-sectional view of the enclosure 12 is seen taken along the line 9—9 from FIG. 4. FIG. 9 illustrates the interior relationship of the first back cover 22 and second back cover 36 in their suspended downward states. The club carrier bracket 10 can be seen passing through the first back cover 22 and into the depth provided by the second back cover 36.

In now referring to FIGS. 10, 11, 12 and 13, the enclosure 12 can be seen in much greater detail in cross-sectional views taken along its longitudinal axis. In particular, the rearward periphery of the roof panel 14 and the roof structure 8 are shown relative to the points of coupling of the first back cover 22 and the second back cover 26. FIG. 10 shows the relative order of attachment, by way of standard conventional stitching, of the first securing means, the first back cover 22, the second securing means, the second back cover 36 and the hem portion 18 to the underside 16 of the roof panel 14 about its periphery. The first securing means is comprised of a plurality of long straps 44 that are used to secure and retain the first back cover 22 about the periphery of the roof structure 8 under the hem portion 18. The second securing means is comprised of a plurality of short straps 46 that are used to secure and retain the second back cover 36 about the periphery of the roof structure 8 under the hem portion 18. FIG. 10 is illustrative of the plurality of long straps 44, the plurality of short straps 46 and the hem portion 18 in their relative positions when the first back cover 22 and second back cover 36 are in their suspended downward states.

FIG. 11 shows the first back cover 22 in a suspended downward state while a bight of the second back cover 36 has been rolled up, secured and retained by way of the plurality of short straps 46 being coupled to the hem portion 18. The plurality of short straps 46 couple to the hem portion 18 by way of conventional snaps. In contrast, FIG. 12 shows a bight of the first back cover 22 having been rolled up, secured and retained under the hem portion 18 by way of the plurality of long straps 44 being coupled with the plurality of short straps 46. The short and long straps 46 and 44 are coupled together by way of conventional snaps. The second back cover 36, however, is now in its suspended downward state and the hem portion 18 remains loose.

When securing and retaining a bight of the first back cover 22 and the second back cover 36 at the same time, as is depicted in FIG. 13, the plurality of long straps 44 are coupled with the hem portion 18 so as to retain both back covers 22 and 36 under the hem portion 18 about the periphery of the roof structure 8. The plurality of short straps 46 remain unused when both back covers 22 and 36 are rolled up.

Thus, the present enclosure 12 provides for easy employment of the respective first and second back covers 22 and 36 and, conversely, rolling-up and storage of the same under the hem portion 18 about the periphery of the roof structure 8. It is noted that the entire enclosure 12 may be completely removed from the golf cart 5 for cleaning in the event that any of the side panels 20 and first and second back covers 22 and 36 become soiled. It is further noted that when the enclosure 12 is not being used, the enclosure 12 is completely retained about the periphery of the roof structure 8.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. An enclosure for a golf cart or other vehicle having a roof structure secured above a body portion of the vehicle and a club carrier bracket, said enclosure comprising in combination:

a roof panel having an underside generally corresponding to the configuration of the roof structure of the golf cart, said roof panel overlying said roof structure;

a hem portion coupled to said roof panel about its periphery;

a first back cover coupled to and suspended from said roof panel about said roof panel's rearward periphery;

a second back cover coupled to and suspended from said roof panel about said roof panel's rearward periphery;

a first securing means positioned about the rearward periphery of said roof panel for retaining said first back cover under said hem portion in a rolled state; and a second securing means positioned about the rearward periphery of said roof panel for retaining said second back cover under said hem portion in a rolled state.

2. The enclosure as recited in claim 1, wherein said second securing means is comprised of a plurality of short straps having snaps that removably engage snaps of said hem portion.

3. The enclosure as recited in claim 2, wherein said first securing means is comprised of a plurality of long straps having snaps that removably engage snaps of said plurality of short straps.

4. The enclosure as recited in claim 1, wherein said first back cover further includes a horizontal slit and a closure flap, said slit being positioned so as to facilitate the passing through of the club carrier bracket, said closure flap being integral with said first back cover and positioned so as to cover said slit after the passing of the club carrier bracket therethrough.

5. The enclosure as recited in claim 4, wherein said first back cover includes a first upper transparent portion and a first lower translucent portion.

6. The enclosure as recited in claim 1, wherein said second back cover further comprises a second upper transparent portion and a second lower translucent portion.

7. The enclosure as recited in claim 6, wherein said second back cover further includes a fastener means for securing said second upper transparent portion to said second lower translucent portion, said fastener means facilitating the accessing of rear of golf cart.

8. The enclosure as recited in claim 7, wherein said fastener means comprises a zipper.

9. The enclosure as recited in claim 5, wherein said first back cover further includes a vertical slit positioned in said first lower translucent portion, said vertical slit facilitating the placement of said club carrier bracket through said horizontal slit.

10. The enclosure as recited in claim 9, wherein said vertical slit further comprises a closing means for securing said vertical slit in a closed state.

11. The enclosure as recited in claim 10, wherein said closing means comprises hook and loop strips.

* * * * *